United States Patent [19]

Lovelady et al.

[11] Patent Number: 5,003,613

[45] Date of Patent: Mar. 26, 1991

[54] DOCUMENT PROCESSING SYSTEM AND METHOD

[75] Inventors: Kenneth T. Lovelady; Medford D. Sanner, both of Irving, Tex.

[73] Assignee: Recognition Equipment Incorporated, Irving, Tex.

[21] Appl. No.: 289,596

[22] Filed: Dec. 21, 1988

[51] Int. Cl.$^5$ .............................................. G06K 7/14
[52] U.S. Cl. ....................................... 382/17; 382/61; 358/80
[58] Field of Search ....................... 382/17, 31, 50, 54, 382/61, 62, 63; 358/80

[56] References Cited

U.S. PATENT DOCUMENTS

| | | | |
|---|---|---|---|
| Re. 29,104 | 1/1977 | Shepard | 382/17 |
| 3,444,517 | 5/1969 | Rabinow | 340/146.3 |
| 3,761,876 | 9/1973 | Flaherty et al. | 340/146.3 |
| 3,893,166 | 7/1975 | Pugsley | 358/80 |
| 4,021,777 | 5/1977 | Shepard | 340/146.3 |
| 4,110,826 | 8/1978 | Mollgaard et al. | 364/526 |
| 4,205,780 | 6/1980 | Burns et al. | 235/454 |
| 4,323,919 | 4/1982 | Fujii et al. | 358/75 |
| 4,414,635 | 11/1983 | Gast et al. | 364/526 |
| 4,488,245 | 12/1984 | Dalke et al. | 358/80 |
| 4,547,897 | 10/1985 | Peterson | 382/8 |
| 4,628,534 | 12/1986 | Marshall | 382/41 |
| 4,654,720 | 3/1987 | Tozawa | 358/283 |
| 4,718,091 | 1/1988 | Kobayashi et al. | 382/41 |
| 4,724,544 | 2/1988 | Matsumoto | 382/27 |
| 4,760,607 | 7/1988 | Sternberg et al. | 382/49 |

FOREIGN PATENT DOCUMENTS 0228713 7/1987 European Pat. Off. .

OTHER PUBLICATIONS

*Color TV Training Manual*, 4th Printing 1973, Howard W. Sams & Co., The Bobbs-Merrill Co., pp. 34–37.

Primary Examiner—Leo H. Boudreau
Assistant Examiner—Tan Dinh
Attorney, Agent, or Firm—Ross, Howison, Clapp & Korn

[57] ABSTRACT

A document processing system for processing documents having data printed thereon including pre-printed markings visible to the eye and machine-readable characters includes a scanner for capturing the color image of the document being processed. Circuitry is provided for reducing the contract between the pre-printed marking and the background surrounding a machine-readable character based upon the hue of the pre-printed markings, such that the pre-printed markings and the background surrounding a character are not distinguishable with respect to light reflected from the document thereby generating a filtered image of the document. An optical character recognition device receives the filtered image of the document representing character information only for identifying the characters appearing on the document.

15 Claims, 1 Drawing Sheet

DOCUMENT PROCESSING SYSTEM AND METHOD

TECHNICAL FIELD

This invention relates to document processing systems and methods for processing documents, and more particularly, to an image capture and optical character recognition system in which pre-printed character location markings do not interfere with the reading of the characters.

BACKGROUND OF THE INVENTION

Many documents carry informational markings and pre-printed character location markings visible to the eye which assist the document preparer in completing required information on the document Many pre-printed forms utilize these pre-printed character location markings for confining characters to specific locations and sizes in order to assist a character reader in identifying the characters added to the document.

Various commercially available optical character recognition devices function well in identifying characters which are clearly separated from extraneous lines, dots, printed material, and other visible matter which may be pre-printed on the document and which is not intended to be read by the optical character recognition device. Such OCR devices do not experience great difficulty in identifying a single character or line of characters on an otherwise clear surface. Similarly, optical character recognition devices experience little difficulty in identifying all of the characters on an entire page, provided that there are no extraneous markings on the page and that the characters are properly registered. On some documents; however, it is essential that characters be printed on forms which are pre-printed in a manner such that writing areas are separated by visible lines or other marks. Such lines are necessary for separating the data in an orderly fashion. Many government forms such as income tax forms, census forms, social security forms, and others, have boxes within which machine identification of hand-printed characters is assisted if visible constraint marks on the document are pre-printed to assist the preparer of the document. The desirability of the pre-printed character location markings can be balanced against the problems of optical character recognition devices in recognizing characters on documents containing such markings. The OCR devices must rely on light reflectance from the character-background and absorption from the characters themselves to distinguish between true characters which are to be identified by the OCR device, and other visible markings adjacent to the character, touching or passing through the characters or surrounding the characters.

Document processing systems have been proposed in order to allow the OCR device to distinguish between the pre-printed character location markings and the actual characters to be read. One such system is described in U.S. Pat. No. 3,444,517, issued to J. Rabinow on May 13, 1969 and entitled "Optical Reading Machine and Specially Prepared Documents Therefor". This optical reading machine utilizes pre-printed documents in which the character location markings are printed in fluorescent material. The document is subjected to exciting radiation during the reading cycle such that the true characters will reflect very little of the radiations, but the marks will be energized in a manner to emit energy to which a scanner photocell is sensitive. Although these marks under ordinary light appear to be visible, when energized, in cooperation with their radiation source, these marks emit energy in such a way that the scanner photocell provides output signals as though the marks did not exist or that the marks are brighter than the background or the characters to be read. Therefore the entire black-to-white range for the device examining the characters is uneffected.

Many documents are pre-printed in a variety of colors in which the background as well as the character location markings may be printed with different colored inks. In order to eliminate the pre-printed color location markings which are printed with colored inks, various optical filters and lenses have been utilized in order to prevent this information captured from the document being presented to the optical character recognition device such that the optical character recognition device is "blind" to these colored inks. Color-sensitive photocells are utilized in the character recognition device in order to filter out the pre-printed character location pixel information and only present the true character pixel information to the optical character recognition device. Such systems require multiple optical filters which must be interchanged depending upon the colors of the ink utilized on the pre-printed form.

Another system proposed in order to prevent interference of pre-printed character location markings from the actual characters to be read on a document is described in U.S. Pat. No. RE.29,104, issued to David H. Shepard on Jan. 4, 1977 add entitled "Method of Scanning Documents to Read Characters Thereon Without Interference From Visible Marks on the Document Which Are Not To Be Read By the Scanner". This system utilizes a laser scanner unit adapted to scan a document. The color of the markings on the documents which are not to be read is related to the laser wavelength so that the light reflected from the markings has the same intensity as the light reflected from the document background and the presence of these pre-printed character location markings does not interfere with the reading of the characters. The laser wavelength is therefore keyed to the color of the pre-printed character location markings, and such a system would not have the ability to easily adapt to different colored pre-printed markings on numerous documents as well as to different colored pre-printed character location markings on the same document to be processed and read by an optical character recognition device.

For many applications, document processing systems also have the requirement of displaying an image of the document being processed by the system. The image may be used by an operator for verifying or correcting data read by the optical character recognition portion of the document processing system. It is desirable for the displayed image to accurately reflect the actual image of the document for use by the operator of the document processing system. The image displayed should therefore include the pre-printed character location markings which, as previously stated, interfere with the recognition process of optical character recognition devices within the document processing system. If the data presented to the optical character recognition unit is also displayed to the operator, much of the actual informational content of the document is missing, and the user of the system does not have the ability to view a true image of the document being processed. Systems have been proposed for independently capturing the image of a document and for capturing data for input to an optical character recognition device. Such a dual capture system is described in U.S. Pat. No. 4,205,780, issued to Emmett Burns et al. on June 3, 1980, and which is entitled "Document Processing System and Method". This system, like other systems utilizing optical character recognition devices require separate data catpure devices which are separately optimized for image and data capture functions.

A need has thus arisen for a document processing system for processing documents having pre-printed character location markings which are visible to the eye, but which are "blind" to an optical character recognition device and which further displays an accurate image of the document. Such a document processing system must be capable of processing documents having numerous colors without mechanically changing optical filters as well as eliminating different colored "blind" inks on the same document. Such a document processing system further requires the ability to operate with specially prepared forms, documents, or other surfaces on which characters to be read by a character recognition device are formed in a manner such that the marks other than the true characters are rendered indistinguishable by the optical character recognition device from the background reflectance of the surface.

A need has further arisen for a document processing system having a single data lift for capturing both an image of a document and characters to be presented to an optical character recognition device. Such a system must also be programmable for recognizing different types of optical characters, be electronically changeable for the display of different types of document images as well as having a fast response time as colors change.

SUMMARY OF THE INVENTION

In accordance with the present invention, a document processing system for processing documents having data printed thereon including pre-printed markings visible to the eye and machine-readable characters is provided. The system includes a scanner for capturing the color image of the document being processed. Circuitry is provided for reducing the contrast between the pre-printed markings and the background surrounding a machine-readable character based upon the color of the pre-printed markings, such that the pre-printed markings and the background surrounding a character are not distinguishable with respect to light reflected from the document thereby generating a filtered image of the document. An optical character recognition device receives the filtered image of the document representing character information only for identifying the characters appearing on the document.

In accordance with another aspect of the present invention, a method for processing documents is provided. The method includes the step of capturing the color image of a document using a color scanner/camera. The image of the document is electronically processed. The contrast between the pre-printed markings appearing on the document and the background surrounding a machine-readable character is reduced. The filtered image is utilized by an optical character recognition device in order to identify the character.

BRIEF DESCRIPTION OF DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
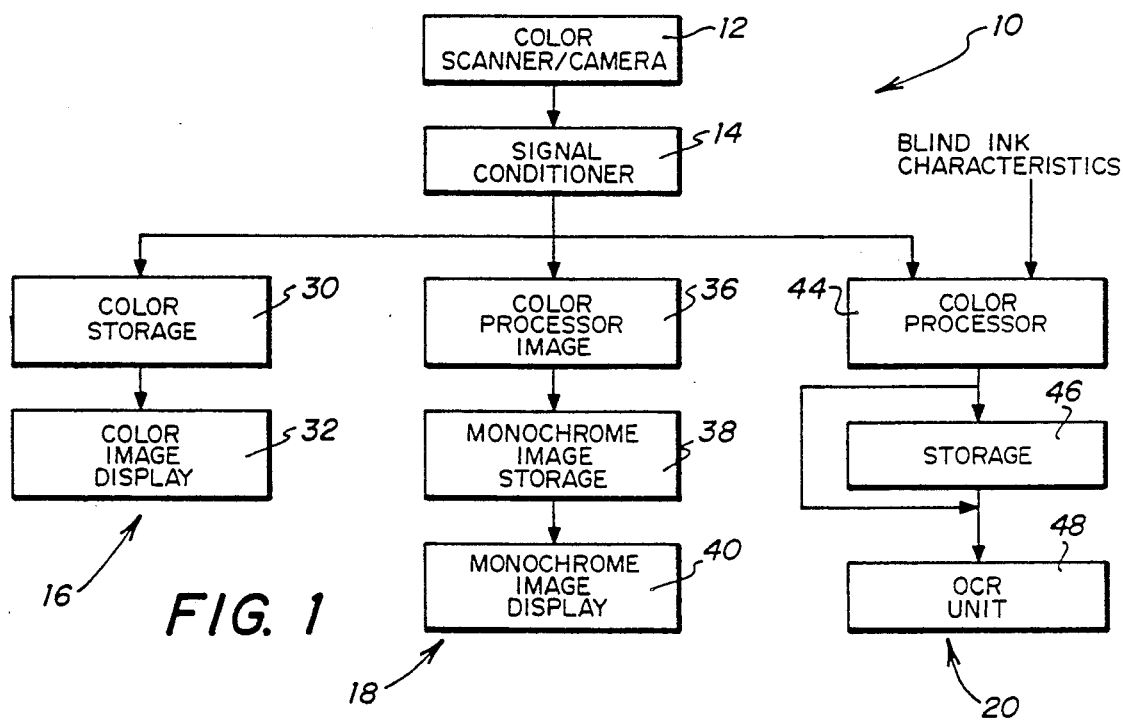
FIG. 1 is a block diagram of the present document processing system.

Referring to FIG. 1, the present document processing system is generally identified by the numeral 10. Document processing system 10 is utilized for processing documents of a variety of types in which pre-printed information and character location markings visible to the eye appear. These markings assist the preparer of a document in identifying information and location of data and in placing and forming characters to be added to the document. The pre-printed markings may include lines, boxes, dots, and other guides which are not intended to be read by the optical character recognition device processing the document. These markings are typically printed in "blind" ink, reflective inks or drop-out colors and although they are visible to the eye, they need to be invisible to the character recognition device. These pre-printed markings may be printed in any color ink and the present system 10 can be utilized with documents having different colored inks appearing on the same document.

Most optical character recognition devices are required to identify characters printed upon an optically contrasting surface. The usual requirement is that the characters be dark and the background be light so that the black-to-white ratio is as large as possible. Under ordinary illumination, the characters are as light-absorbent as possible, while the background area is as light-reflective as possible. Poor or degraded OCR print may have print contrast ratios as low as the blind ink or reflectances as high as the blind ink, and therefore, the OCR print cannot be thresholded without intereference if the blind ink is not removed. Difficulty is also experienced in these optical character recognition devices as previously stated because of the requirement that there be extraneous printed material on the same surface as the characters which are to be identified. As used herein, these pre-printed markings, hereinafter referred to as markings, are visible to the eye and may be in the form of lines, boxes surrounding a character, written instructions on the document, and other markings which adversely affect the operation of the optical character recognition device. These markings will be discussed in connection with FIG. 2. The present invention reduces the contrast between the markings and the background surrounding a character to be read by subtracting a percentage of the complimentary color of the markings from the color channel that best matches the hue of the marking. The resulting output has the same intensity level for the markings as the character background intensity. Therefore, the background intensity is "seen" as the same intensity as the markings, such that the marking becomes blind to the optical character recognition device.

The present document processing system 10 utilizes a color scanner/camera 12 for capturing, in color, the image of the document to be processed. Color scanner/camera 12 utilizes a three-color image sensor which scans the document on a point-by-point basis and produces video signals which are applied to a signal conditioner 14. Color scanner/camera 12 may include, for example, a model TCD 116 color array, manufactured and sold by Toshiba Corporation of America, which produces 400 color points per inch with red, green, blue (RGB) output channels.

The output of color scanner/camera 12 is amplified, DC restored and the multiple outputs of color scanner 12 are balanced to prevent seams between segments utilizing a signal conditioner 14. A gain correction is applied to each pixel by signal conditioner 14 in order to normalize each cell to the same sensitivity such that the R, G, B color channels are all normalized to "1" when viewing a calibrated white surface, thereby maintaining the effect of an "equal energy" white illuminator.

The R,G,B, output of signal conditioner 14 is simultaneously applied to three processing channels of document processing system 10. The three channels include a color image channel 16; monochrome image channel 18 and optical character recognition (OCR) channel 20. Each channel, 16, 18 and 20 functions independently of the other and either or both of channels 16 and 18 may be utilized with document processing system 10.

The output of signal conditioner 14 is applied to a color storage unit 30 within channel 16 of document processing system 10. The output of color storage unit 30 is applied to a color image display 32 which may, for example, provide a 1024 by 1024 pixel image at 24 bits per pixel. The image displayed on color image display 32 represents the color image of the document captured by color scanner/camera 12, and may be used to assist an operator of document processing system 10 to identify characters which could not be recognized by the optical character recognition unit of the present invention.

The output of signal conditioner 14 is also applied to a color processor image unit 36 within channel 18 of document processing system 10. Color processor image unit 36 functions to convert the R, G, B channels of color scanner/camera 12 into a monochrome signal which represents the image of the document captured by color scanner/camera 12 according to its brightness. The proportions of each of the color signals from color scanner/camera 12 that are used to form the luminance signal are in the following proportions: 59% of the green signal, 30% of the red signal, and 11% of the blue signal. A system for forming the luminance signal is described in a publication entitled "Color TV Training Manual", published by Howard W. Sams and Co., Inc., the Bobbs-Merrill Co., Inc., Indianapolis, Ind., 4th Printing, 1973, Pages 34–37, which description is incorporated herein by reference. The output of color processor image unit 36 is applied to monochrome image storage unit 38 which output is applied to a monochrome image display 40. Display 40 displays to the operator of document processing system 10 the image of the document captured by color scanner/camera 12 in a black/white or monochrome image. The monochrome image of the document displayed by monochrome image display 40 may be utilized in a manner similar to the display provided by color image display 32 by the operator of the present document processing system 10.

The output of signal conditioner 14 is also applied to channel 20 of the present document processing system 10, and more specifically to a color processor unit 44. Color processor unit 44 also receives an input provided by the system software or by an operator indicating the blind ink characteristics, and more specifically, the hue of the blind ink. Color processor unit 44 functions to electronically filter the pre-printed markings from the data captured by color scanner/ camera 12 for presentation to OCR unit 48 for character recognition. The output of color processor unit 44 may be applied directly to OCR unit 48 or stored in a storage unit 46 for subsequent application to OCR unit 48.

Color processor unit 44 comprises, for example, the three-dimensional color detection and modification system described in U.S. Pat. No. 4,488,245, which issued to G.B. Dalke et al. on Dec. 11, 1984 and which is entitled, "Method and Means for Color Detection and Modification". The specification and drawings of the '245 patent are incorporated herein by reference.

In an alternate embodiment of the present document processing system 10, color processor unit 44 functions as an electronic filter to subtract a percentage of the complimentary color of the pre-printed markings from the color channel (RGB) that best matches the hue of the pre-printed markings. The result is that the background intensity is "seen" as the same intensity as the pre-printed markings, such that the markings become blind to the optical character recognition unit 48. In this embodiment, color process unit 44 may include, for example, a look-up table for generating the complimentary hue based upon an input of the blind ink characteristics. The hue of the blind ink may be preset by operation of the system software depending upon the particular form or document being processed, an operator input switch or operator menu selection or as described in the '245 patent.

Color processor unit 44 functions to subtract a percentage of the complimentary color from the blind ink channel or plane. The amount to be subtracted is the difference between: (1) the blind ink value in the blind ink channel comprising the image of the pre-printed markings, and: (2) the white or background color in the blind ink channel representing the area surrounding a character to be recognized. Since there is no blind ink energy in the complement color, nothing is subtracted from the blind ink channel while processing blind ink pixels. When reflectance is from the background around a character however, a complement output is maximum and the subtraction reduces the value of the white background pixels down to the value of the blind ink reflectance or energy thereby making white and the blind ink equal, resulting in zero contrast. When a pixel is black or non-blind ink color representing a character to be recognized, the contrast is enhanced slightly depending upon the intensity and hue of the color. Color processor unit 44 performs the following arithmetic operations for red, blue and green blind inks used to print the pre-printed character location markings:

$$R = \frac{1}{1 - \%} (BIH - \% \, CH) \quad (1)$$

where: R is the blinded result; (output of color processor unit 44)
BIH is the blind ink hue;

CH is the complement of the blind ink hue;
% is 1 - reflectance of the blind ink in the hue channel; and $$\frac{1}{1-\%}$$

is the rescaling factor.

The resulting pixel amplitude or brightness if rescaled back to 100% utilizing the factor $$\frac{1}{1-\%}.$$

The complement of the blind ink colors for green is magenta, which is red plus blue divided by 2; for red is cyan; which is blue plus green divided by 2; and for blue is yellow, which is red plus green divided by 2. The pre-printed markings could be magenta, cyan, and yellow in which case the complements are red, blue, and green, respectively. In general, the best complementary color to use is the channel or combination of channels that has the least amount of blind ink energy.

The output of color processor unit 44 is applied to an optical character recognition unit 48. This output represents only pixels representing the data content of characters to be recognized and the background surrounding such characters with the pre-printed markings having been eliminated by operation of color processor unit 44. OCR unit 48 may comprise, for example, a system described in U.S. Pat. No. 3,761,876, which issued to L. Flaherty, et al. on Sept. 25, 1973 which is entitled "Recognition Unit for Optical Character Reading System" which description and drawings are incorporated herein by reference.

Figure 2:
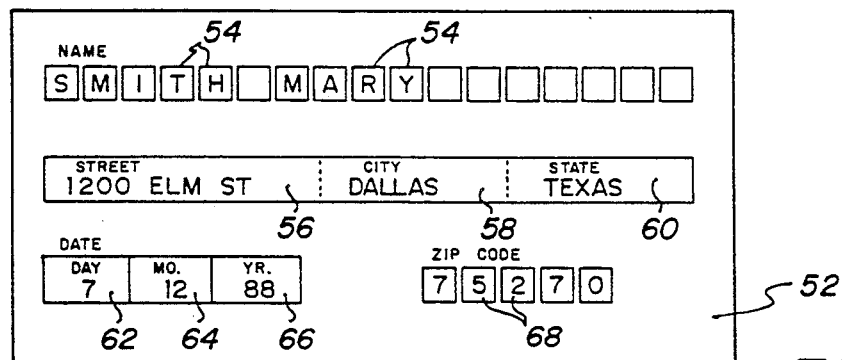
FIG. 2 is an illustration of a document processed by the present document processing system.

Referring now simultaneously to FIGS. 1 and 2, a document 52 (FIG. 2) is illustrated which is representative of documents processed by the present document processing system 10. Document 52 includes pre-printed character location markings as well as written instructions which interfere with the operation of OCR unit 48 during character recognition. Document 52 includes pre-printed character location markings in the form of boxes 54 which are used by the individual completing document 52 to locate and form the characters comprising the name "SMITH MARY". Also indicated on document 52 is a designated area for the address of the individual completing document 52, including a field 56 for the street, field 58 for the city and field 60 for the state. The pre-printed markings include the words "Street", "City", and "State" in addition to the dotted lines separating fields 56, 58 and 60. Further included on document 52 is an area for completing the date which includes fields 62, 64 and 66 representing the day, month and year. Instructional information is printed within each field representing "DAY"; "MO."; "YR.". Finally, a portion of document 52 requests completion of the individual's zip code and includes boxes 68 for locating the numerals of the zip code.

Figure 3:
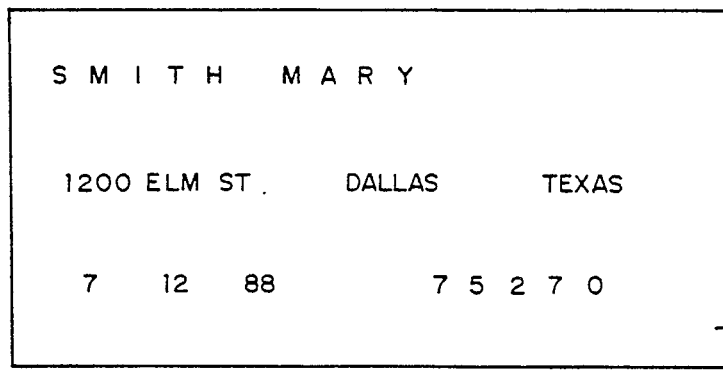
FIG. 3 is an illustration of the data from the document shown in FIG. 2 that is presented to the optical character recognition unit of the present document processing system.

FIG. 3 illustrates the data of document 52 after document 52 has been processed by color processor unit 44. The pre-printed markings have been "eliminated" and are not presented to OCR unit 48. All lines, boxes surrounding characters, and written instructions on document 52 which adversely affect the operation of OCR unit 48 have been electronically filtered and are not presented to OCR unit 48. Displays 32 and 40 of document processing system 10 will display to the operator of system 10 the image of document 52 in color or in monochrome, respectively, as represented in FIG. 2.

The present document processing system 10 therefore operates on all colors of inks utilized for pre-printing on the document. Color scanner/camera 12 functions to capture the content of the user supplied character information as well as the pre-printed markings in a single data lift. This captured data is supplied to image displays 32 and/or 40 for displaying to the user of document processing system 10 an image of the document as well as the portion of the captured data representing the character information to OCR unit 48 for character recognition purposes. The pre-printed markings are "blinded" from OCR unit 48 by automatically reducing the contrast of the blind ink without utilizing mechanical filters, fluorescent inks or wavelength dependent laser scanners.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A document processing system for processing documents having data printed thereon including markings visible to the eye but which are not to be read by the system and machine-readable characters which are to be read by the system comprising:

means for scanning a document for capturing the color image of the document being processed;

means connected to said scanning means for reducing the contrast between the markings and the background surrounding a machine-readable character based upon the color of the markings, and for generating a filtered image of the document;

means for inputting the color of the markings to said means for reducing the contrast; and optical character recognition means for receiving said filtered image of the document representing character information only for identifying the characters appearing on the document from said filtered image, such that the markings and the background surrounding a machine-readable character are not distinguishable by said optical character recognition means.

2. The document processing system of claim 1 and further including display means for displaying the color image of the documents and the markings captured by said scanning means.

3. The document processing system of claim 1 and further including display means for displaying a monochrome image of the documents and the markings captured by said scanning means.

4. The document processing system of claim 1 wherein said contrast reducing means includes:

means for subtracting a percentage of the hue that is complementary to the hue of the markings from the hue of the markings, such that the color of the background surrounding a machine-readable character is detected by said optical character recognition means as the color of the markings.

5. A document processing system for processing documents having data printed thereon including markings visible to the eye but which are not to be read by the system and machine-readable characters which are to be read by the system comprising:

means for scanning a document for capturing the color image of the document being processed;

means connected to said scanning means for identifying and selectively modifying the color of the markings, and for generating a filtered image of the document;

said means for selectively modifying the color of the markings comprising:

a. input means for receiving input color signals which represent a colored image, from said scanning means and for converting said colored image into a plurality of pixel portions, each pixel having a discrete location;

b. digital conversion means for converting the input color signal at each pixel into three digital coordinate values, said first coordinate value representing an approximation of luminance, said second and third coordinate values representing chromaticity;

c. sampling means for selectively sampling one or more of said pixels for which selective modification is desired;

d. means for storing said second and third chromaticity coordinate values as a function of said luminance coordinate values for each pixel sampled by said sampling means, said means defining a three-dimensional curve in color space when said second and third chromaticity coordinate values are stored in a memory means, said luminance coordinate defining the longitudinal path of said curve while said second and third chromaticity coordinate values define the LOCI of said curve at each level of luminance sampled;

e. function generator means for defining a three-dimensional color sub-space around said curve, said function generator means defining a weighted value for each pixel having color coordinate values that fall within said three-dimensional color sub-spaces;

f. comparator means for sequentially sampling each pixel in said image and comparing the color coordinate values of said pixel with the color coordinate values of the color sub-space defined by said function generator means; and g. means responsive to said comparator means to combine a color signal with said input signal for each pixel having color coordinate values falling within said defined color sub-space; and optical character recognition means for receiving said filtered image of the document representing character information only and for identifying the characters appearing on the document from said filtered image, such that the markings and the background surrounding a machine-readable character are not distinguishable by said optical character recognition means.

6. The document processing system of claim 5 and further including:

display means for displaying the color captured image of the documents including the markings captured by said scanning means.

7. The document processing system of claim 5 and further including:

display means for displaying a monochrome image of the documents and the markings captured by said scanning means.

8. A method for processing documents comprising the steps of:

capturing the color image of the document being processed;

inputting to a filter the color of the markings appearing on the document;

filtering from the captured image of the document, the markings appearing on the document based upon the input color of the markings by reducing the contrast between the markings and the background surrounding a machine-readable character appearing on the document; and identifying the machine-readable characters appearing on the document from the filtered image of the document.

9. The method for processing documents of claim 8 and further including the step of:

displaying the captured image of the documents being processed including the markings at a visual display.

10. The method for processing documents of claim 8 wherein the step of filtering the image of the document includes the step of subtracting a percentage of the complimentary hue to the hue of the markings from the hue of the markings.

11. A document processing system for processing documents having data printed thereon including markings visible to the eye but which are not to be read by the system and machine-readable characters which are to be read by the system comprising:

means for scanning a document for capturing the color image of the document being processed;

means connected to said scanning means for reducing the contrast between the markings and the background surrounding a machine-readable character thereby generating a filtered image of the document;

means for inputting the color of the markings to said contrast reducing means;

said contrast reducing means including means for subtracting a percentage of the hue that is complementary to the hue of the markings from the hue of the markings; and optical character recognition means for receiving said filtered image of the document representing character information only for identifying the characters appearing on the document from said filtered image, such that the color of the background surrounding a machine-readable character is detected by said optical character recognition means as the color of the markings.

12. The document processing system of claim 11 and further including display means for displaying the color image of the documents and the markings captured by said scanning means.

13. The document processing system of claim 11 and further including display means for displaying a monochrome image of the documents and the markings captured by said scanning means.

14. A method for processing documents comprising the steps of:

capturing the color image of a document being processed;

inputting to a filter the color of the markings appearing on the document;

filtering from the captured image of the document the markings appearing on the document based upon the input color of the markings by reducing the contrast between the markings and the background surrounding a machine-readable character appearing on the document by subtracting a percentage of the complimentary hue to the hue of the markings from the hue of the markings; and identifying the machine-readable characters appearing on the document from the filtered image of the document.

15. The method of claim 14 and further including the step of:

displaying the captured color image of the document being processed including the markings at a visual display.

* * * * *